(12) United States Patent
Cerny

(10) Patent No.: US 11,494,969 B2
(45) Date of Patent: Nov. 8, 2022

(54) SYSTEM AND METHOD FOR ACCELERATED RAY TRACING WITH ASYNCHRONOUS OPERATION AND RAY TRANSFORMATION

(71) Applicant: Sony Interactive Entertainment LLC, San Mateo, CA (US)

(72) Inventor: Mark Evan Cerny, Los Angeles, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

(21) Appl. No.: 16/998,212

(22) Filed: Aug. 20, 2020

(65) Prior Publication Data

US 2022/0058855 A1 Feb. 24, 2022

(51) Int. Cl.
*G06T 1/20* (2006.01)
*G06T 15/06* (2011.01)
*G06T 15/80* (2011.01)
*G06T 15/00* (2011.01)

(52) U.S. Cl.
CPC ............. *G06T 15/06* (2013.01); *G06T 1/20* (2013.01); *G06T 15/005* (2013.01); *G06T 15/80* (2013.01)

(58) Field of Classification Search
CPC ......... G06T 1/20; G06T 15/005; G06T 15/06; G06T 15/80
USPC .................................................. 345/426, 501
See application file for complete search history.

(56) References Cited

U.S. PATENT DOCUMENTS

| | | |
|---|---|---|
| 10,699,370 B1 | 6/2020 | Vaidyanathan et al. |
| 2011/0234583 A1 | 9/2011 | Bakalash |
| 2016/0070820 A1 | 3/2016 | Laine et al. |
| 2017/0270146 A1 | 9/2017 | Harrison et al. |
| 2019/0019326 A1* | 1/2019 | Clark .................... G06T 17/005 |
| 2020/0050451 A1* | 2/2020 | Babich .................. G06F 9/4843 |
| 2020/0051315 A1 | 2/2020 | Laine et al. |
| 2020/0051316 A1 | 2/2020 | Laine et al. |

(Continued)

OTHER PUBLICATIONS

Mark Evan Cerny, "System and Method for Accelerated Ray Tracing", related U.S. Appl. No. 16/998,195, Applicant's response to Non-Final Office Action filed Nov. 15, 2021.

(Continued)

*Primary Examiner* — Jacinta M Crawford
(74) *Attorney, Agent, or Firm* — John L. Rogitz

(57) ABSTRACT

A graphics processing unit (GPU) includes one or more processor cores adapted to execute a software-implemented shader program, and one or more hardware-implemented ray tracing units (RTU) adapted to traverse an acceleration structure to calculate intersections of rays with bounding volumes and graphics primitives asynchronously with shader operation. The RTU implements traversal logic to traverse the acceleration structure including transformation of rays as needed to account for variations in coordinate space between levels, stack management, and other tasks to relieve burden on the shader, communicating intersections to the shader which then calculates whether the intersection hit a transparent or opaque portion of the object intersected. Thus, one or more processing cores within the GPU perform accelerated ray tracing by offloading aspects of processing to the RTU, which traverses the acceleration structure within which the 3D environment is represented.

21 Claims, 13 Drawing Sheets

(56) References Cited

U.S. PATENT DOCUMENTS

| | | |
|---|---|---|
| 2020/0051318 A1 | 2/2020 | Muthler et al. |
| 2020/0211152 A1 | 7/2020 | Benthin et al. |
| 2020/0327712 A1 | 10/2020 | Toon |
| 2021/0407175 A1 | 12/2021 | Saleh et al. |
| 2022/0036639 A1 | 2/2022 | Rankouhi et al. |

OTHER PUBLICATIONS

"International Search Report and Written Opinion" dated Sep. 28, 2021 from the counterpart PCT application PCT/US21/46788.

Mark Evan Cerny, "System and Method for Accelerated Ray Tracing", file history of related U.S. Appl. No. 16/998,195, filed Aug. 20, 2021.

Mark Evan Cerny, "System and Method for Accelerated Ray Tracing", related U.S. Appl. No. 16/998,195, Final Office Action dated Apr. 6, 2022.

* cited by examiner

SYSTEM AND METHOD FOR ACCELERATED RAY TRACING WITH ASYNCHRONOUS OPERATION AND RAY TRANSFORMATION

FIELD

The application relates generally to systems and methods for accelerated ray tracing.

BACKGROUND

Ray tracing is used to simulate optical effects in computer-generated 3D graphics by tracing the path of light from the eye of an imaginary observer (typically the camera location) to virtual objects in the graphics. Ray tracing produces optical effects with a higher degree of realism than other techniques such as rasterization but at a greater computational cost. This means that in real-time applications such as video games, ray tracing presents challenges because rendering speed is critical.

SUMMARY

Accordingly, a method for graphics processing includes executing, on a graphics processing unit (GPU), a shader program that performs ray tracing of a 3D environment represented by an acceleration structure. The method includes using a hardware-implemented ray tracing unit (RTU) within the GPU that traverses the acceleration structure at the request of the shader program, and using, at the shader program, results of the acceleration structure traversal.

In example embodiments the acceleration structure traversal by the RTU can be asynchronous with respect to the shader program. In some implementations the results of the acceleration structure traversal by the RTU include the detection of intersection between a ray and bounding volumes contained within the acceleration structure. In some examples the RTU processing includes maintenance of a stack used in the acceleration structure traversal.

The acceleration structure may be a hierarchy with a plurality of levels. In such an embodiment the results of the acceleration structure traversal by the RTU may include detection of a transition from a higher level to a lower level within the plurality of levels of the acceleration structure. The results of the acceleration structure traversal by the RTU can also include detection of a transition from a lower level to a higher level within the plurality of levels of the acceleration structure. The acceleration structure traversal by the RTU may include handling of transitions between the plurality of levels of the acceleration structure.

In non-limiting implementations the results of the acceleration structure traversal by the RTU can include detection of intersection between a ray and primitives contained within the acceleration structure. In such implementations, the results of the acceleration structure traversal by the RTU can include detection of the earliest intersection between a ray and primitives contained within the acceleration structure. Further, the results of the acceleration structure traversal by the RTU may include a sorting by the RTU of the intersections detected by the RTU, by distance of the intersections from ray origin, such that the RTU detects a first intersection between a ray and a primitive as it traverses the acceleration structure, the RTU detects a second intersection between the ray and a primitive as it traverses the acceleration structure, and when communicating results from the RTU to the shader program, the second intersection result is communicated before the first intersection result. If desired, upon detection by the RTU of an intersection between a ray and a primitive contained within the acceleration structure and communication of this result to the shader program, the shader program and RTU subsequently communicate regarding the results of the shader program's hit testing between the ray and the primitive.

Upon detection by the RTU of an intersection between a ray and a bounding volume contained within the acceleration structure and communication of this result to the shader program, the shader program and RTU may subsequently communicate regarding the shader program's determination of whether or not to ignore the intersection, and/or the shader program's determination of the location of the intersection along the ray.

In another aspect, a graphics processing unit (GPU) includes at least one processor core adapted to execute a software-implemented shader, and at least one hardware-implemented ray tracing unit (RTU) separate from the processor core and adapted to traverse an acceleration structure to identify intersections of rays with objects represented in the acceleration structure to generate results and return the results to the shader for identification by the shader of hits associated with the intersections.

In example implementations of this second aspect, the RTU may include hardware circuitry to identify the intersections and the shader can be adapted to identify the hits using software. The shader can be configured with instructions executable by the processor core to shade pixels in 3D computer graphics.

In some embodiments of this second aspect, the RTU may include hardware circuitry to implement traversal logic to traverse the acceleration structure. The RTU may include hardware circuitry to implement stack management of a stack used in traversal of the acceleration structure. Also, the RTU may include hardware circuitry to sort the intersections by distance from an origin.

In some implementations the RTU is adapted to identify the intersections asynchronously with the shader identifying the hits. The shader may include instructions executable by the processor core to read status of the RTU.

In non-limiting embodiments the RTU may include hardware circuitry to transform a ray from the coordinate space used by a higher level of an acceleration structure with a plurality of levels to the coordinate space used by a lower level of the acceleration structure. The RTU also may include hardware circuitry to transform a ray from the coordinate space used by a lower level of an acceleration structure with a plurality of levels to the coordinate space used by a higher level of the acceleration structure, and/or restore ray attributes to the ray attributes used when traversing the higher level of the acceleration structure.

In some examples the RTU may include hardware circuitry to identify a first intersection between a first ray and a first bounding volume contained within the acceleration structure and the shader may include instructions executable to determine whether to ignore the first intersection, and responsive to a determination not to ignore the first intersection, identify a location of the first intersection along the first ray.

The processor core and RTU can be supported on a common semiconductor die. Plural processor cores and plural RTUs can be on the common semiconductor die.

In another aspect, an assembly includes at least one processor core adapted to execute at least one shader to shade pixels in graphics. The assembly also includes at least one raytracing unit (RTU) separate from the processor core. The RTU includes hardware circuitry to identify intersections of rays with objects represented in an acceleration structure for identification of hits associated with the intersections by the processor core, implement logic for traversing the acceleration structure, and implement management of a data stack used in traversing the acceleration structure.

In another aspect, a method for graphics processing includes executing, on a graphics processing unit (GPU), a shader program that performs ray tracing of a 3D environment represented by an acceleration structure. The method also includes asynchronous to the shader program, using a hardware-implemented ray tracing unit (RTU) within the GPU that traverses the acceleration structure at the request of the shader program, and using, at the shader program, results of the acceleration structure traversal.

In another aspect, a method for graphics processing includes executing, on a graphics processing unit (GPU), a shader program that performs ray tracing of a 3D environment represented by an acceleration structure. The method also includes using a hardware-implemented ray tracing unit (RTU) within the GPU that traverses the acceleration structure at the request of the shader program, and using, at the shader program, results of the acceleration structure traversal. The acceleration structure is a hierarchy with a plurality of levels and acceleration structure traversal by the RTU includes handling of coordinate transitions between the plurality of levels of the acceleration structure.

In another aspect, a graphic processing unit (GPU) includes at least one processor core adapted to execute a software-implemented shader, and at least one hardware-implemented ray tracing unit (RTU) separate from the processor core and adapted to traverse an acceleration structure asynchronously with respect to shader operation to identify intersections of rays with objects represented in the acceleration structure to generate results and return the results to the shader for identification by the shader of hits associated with the intersections.

In another aspect, a graphic processing unit (GPU) includes at least one processor core adapted to execute a software-implemented shader and at least one hardware-implemented ray tracing unit (RTU) separate from the processor core and adapted to traverse an acceleration structure to identify intersections of rays with objects represented in the acceleration structure to generate results and return the results to the shader for identification by the shader of hits associated with the intersections. The RTU includes hardware circuitry to implement traversal logic to traverse the acceleration structure including modifying at least one ray to account for a change in coordinate systems during traversal.

The details of the present application, both as to its structure and operation, can best be understood in reference to the accompanying drawings, in which like reference numerals refer to like parts, and in which:

DETAILED DESCRIPTION

Figure 1:
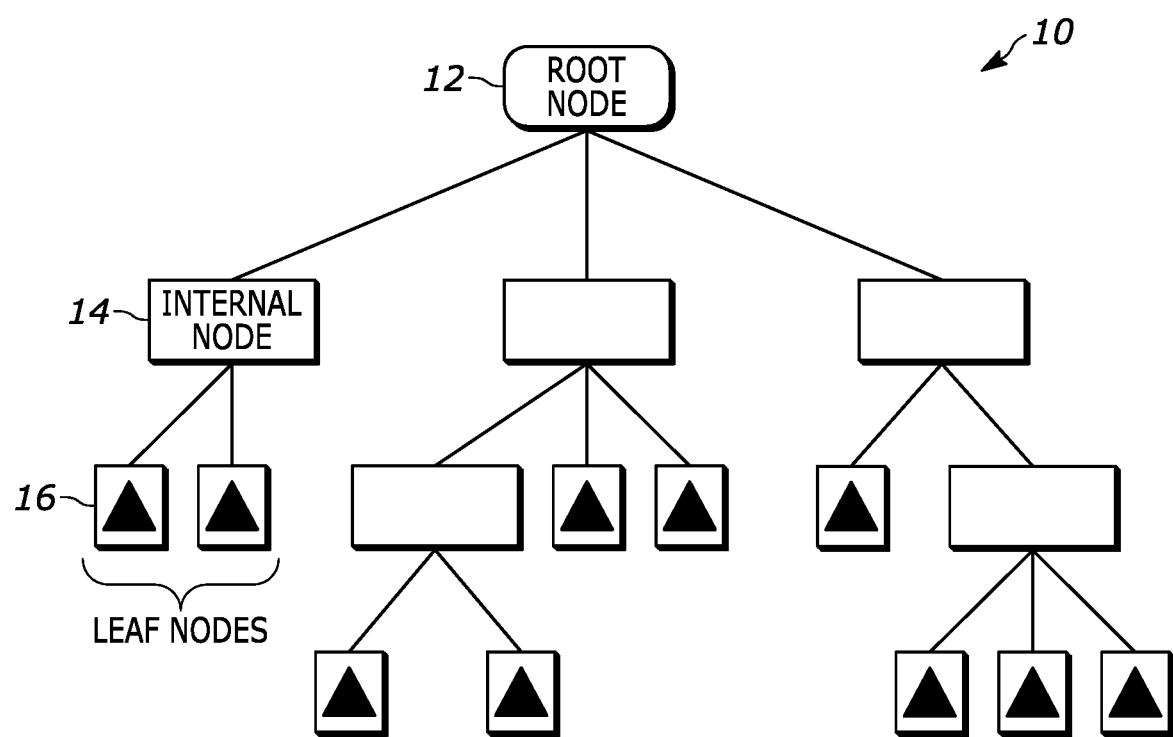
FIG. 1 illustrates an acceleration structure.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony Play Station® or a game console made by Microsoft or Nintendo or other manufacturer, virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or a client and server can be connected over a local intranet or a virtual private network. A server or controller may be instantiated by a game console such as a Sony Play Station®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

A processor or processor core may be a single- or multi-chip processor that can execute logic by means of various lines such as address lines, data lines, and control lines and registers and shift registers. Logic may be represented herein in various forms including flow charts without limiting present principles. For example, state logic may be used where appropriate.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an acceleration structure 10 is shown that is a data structure representing a three-dimensional (3D) environment of computer-generated objects such as may be used for films, computer simulations such as computer games, etc. The architecture of the acceleration structure 10 shown in the example of FIG. 1 is a bounding volume hierarchy (BVH), which is a tree structure with a root node 12, internal nodes 14, and leaves 16. The root node 12 and internal nodes 14 contain a number of bounding volumes, each of which corresponds to a child of the node. Leaves 16 contain one or more primitives, or other types of geometry.

Figure 2:
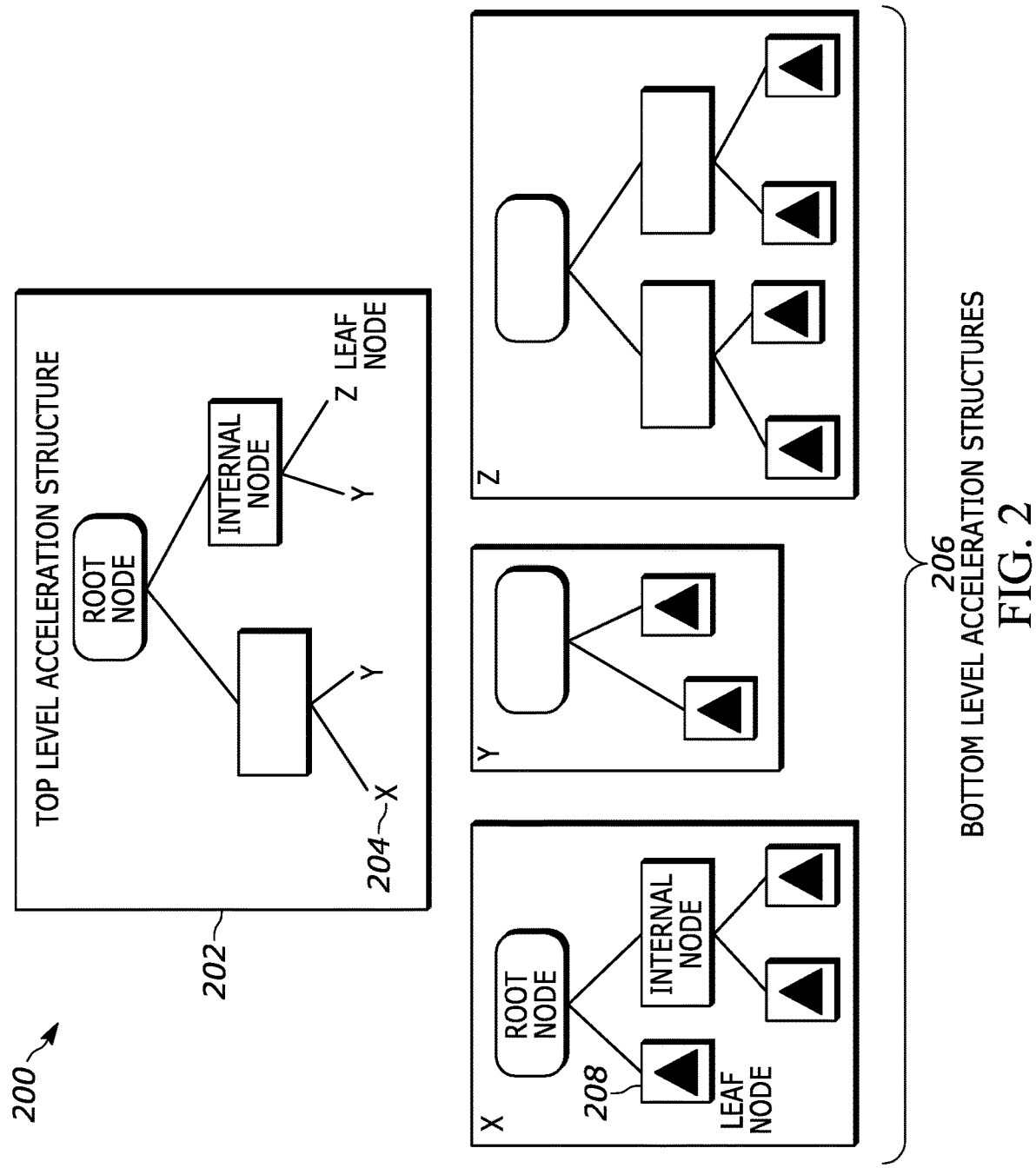
FIG. 2 illustrates further details of a multi-level acceleration structure.

FIG. 2 illustrates an example multi-level acceleration structure 200 with two levels for simplicity. The upper level (the "top level acceleration structure") 202 contains no primitives in its leaves 204; instead, its leaves 204 are references to the lower level (the "bottom level acceleration structures") 206. The bottom level acceleration structure 206 is different from the top level 202 in that the leaves 208 of the bottom level 206 contain primitives.

The top-level acceleration structure 202 may have bounding volumes (and in some applications, primitives) in world space coordinates. Bottom level acceleration structures 206 each have their own coordinate spaces. This allows, for example, the 3D object represented in the bottom level acceleration structure "Y" to appear two times, each in a different location and orientation.

FIGS. 1 and 2 illustrate non-limiting examples of acceleration structures that may be used consistent with present principles.

Figure 3:
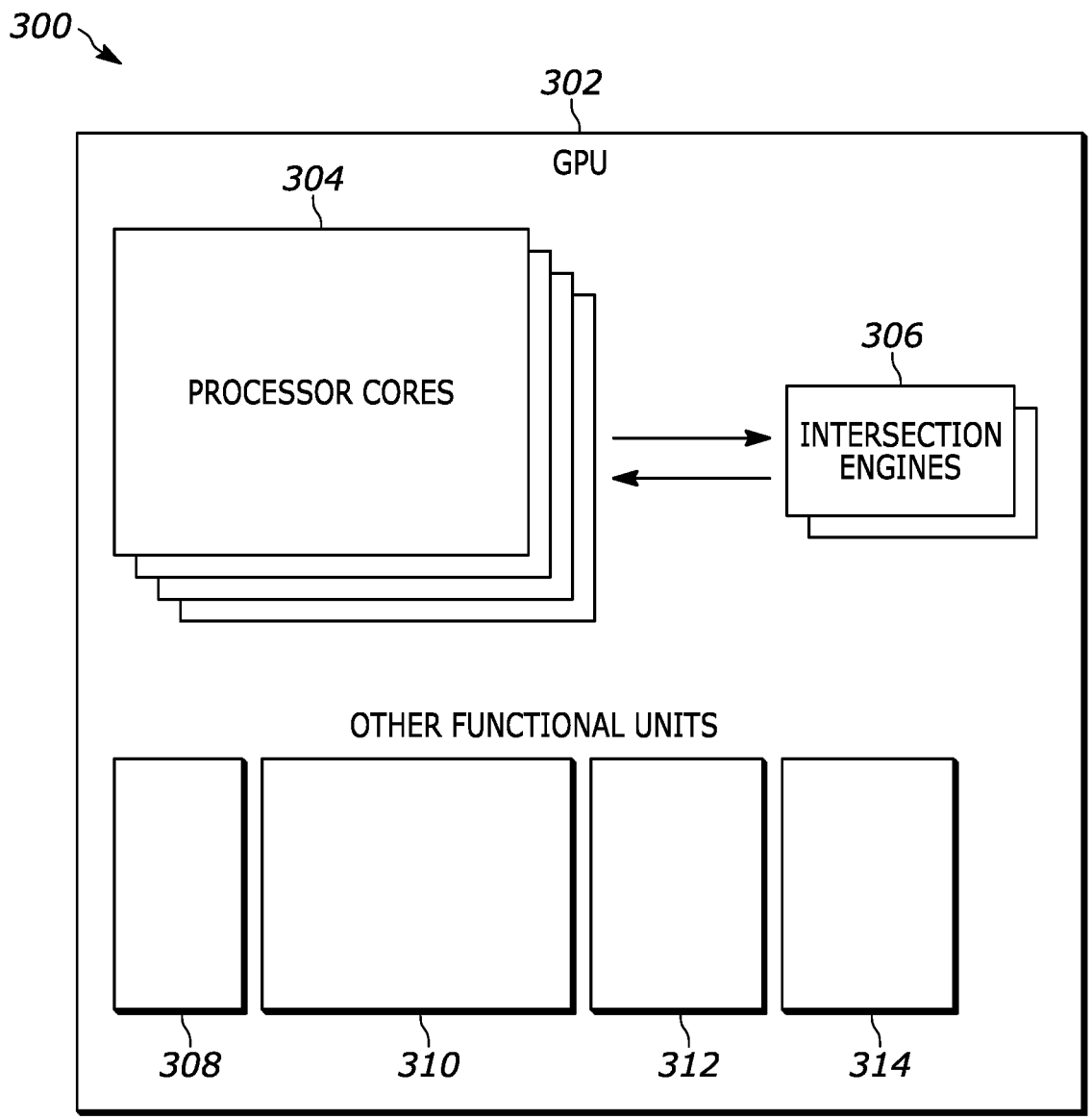
FIG. 3 illustrates a simplified graphics processing unit (GPU)

FIG. 3 is a simplified diagram of a graphics processor unit (GPU) 300 that includes a semiconductor die 302 supporting one or more processor cores 304 (in the example, plural processor cores 304), and one or more (in the example shown, plural) intersection engines 306. The intersection engines assist in ray tracing. The GPU 300 may also include a number of other functional units such as caches 308, memory interfaces 310, rasterizers 312, and render backends 314.

A processor core 304 executes a software-implemented shader program (also referred to herein as "shader") to shoot rays through the 3D environment represented by, e.g., the acceleration structure 200 in FIG. 2, by initializing the ray and then traversing the acceleration structure, successively colliding the ray with the bounding volumes and primitives that the acceleration structure contains. In a simplified embodiment the intersection engines 306, which may be implemented by dedicated hardware, may compute the intersection of the ray with bounding volumes and primitives. Thus, identifying ray-bounding volume and ray-primitive intersections can be offloaded to the intersection engines 306. In the simplified concept of FIG. 3, a processor core 304 transfers the node or leaf address to an intersection engine 306, along with a description of the ray, and after the intersection engine computes the intersection between ray and bounding volume or primitive it returns the results to the processor core.

As understood herein in reference to FIG. 3, however, the bulk of the processing is handled by the shader program, which must perform stack management, track ray state, track intermediate results, and the like. As further understood herein, in practice, due to the large amount of logic and computation handled directly by the shader program, performance may be less than desired. It is in this context that FIG. 4 et seq. are provided.

Figure 4:
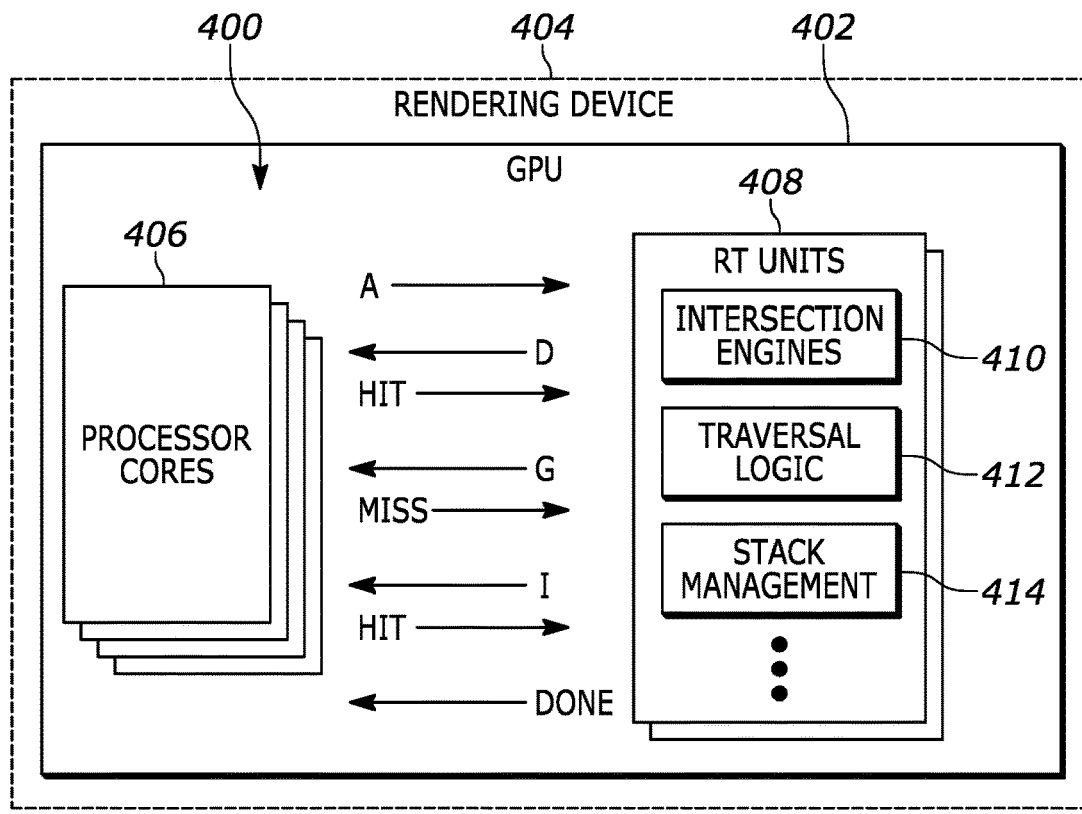
FIG. 4 illustrates an example GPU with ray tracing units (RTU) having hardware circuitry for identifying ray intersections, traversal logic for traversing the acceleration structure, and stack management circuitry, along with a traversal diagram.
Figure 4:
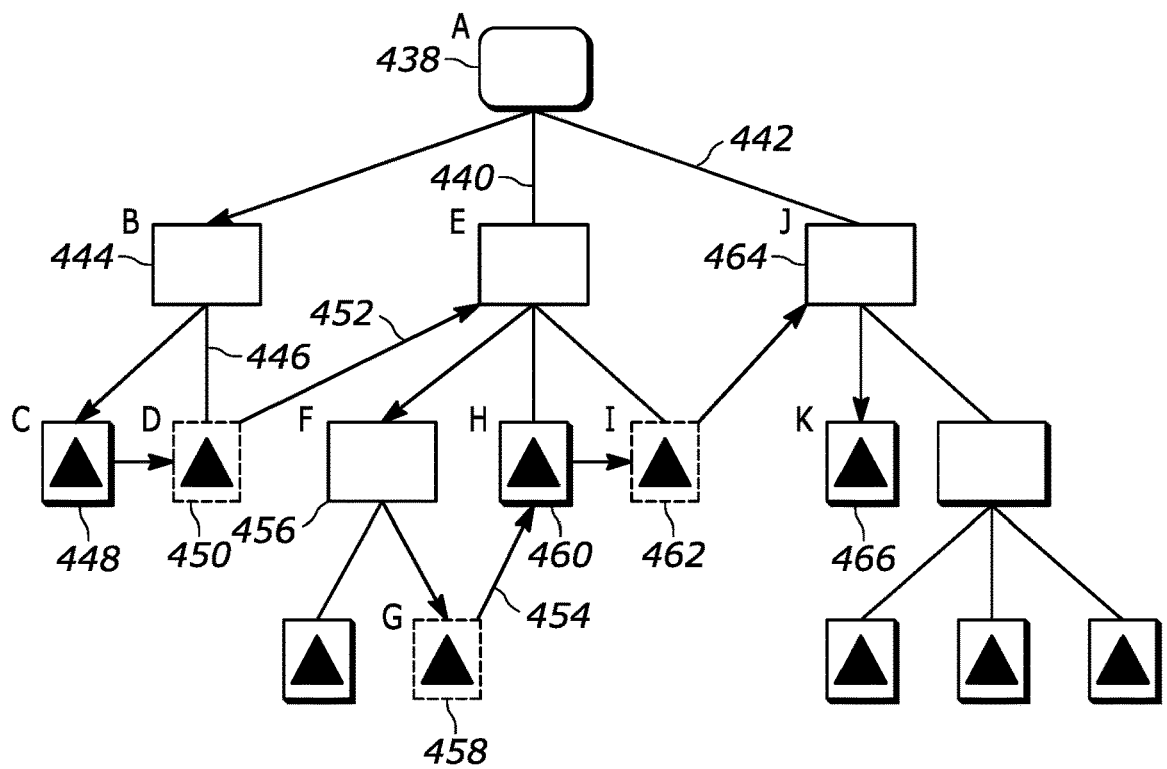

FIG. 4 illustrates a GPU 400 on a common semiconductor die 402 that may be implemented in a rendering device 404 that may be, without limitation, a computer simulation or game console, a computer server streaming games to end users, devices associated with computer-enhanced graphics in films, and the like. The GPU 400 includes one or more (in the example shown, plural) processor cores 406 for executing one or more shader programs and for communicating with one or more (in the example shown, plural) ray tracing units (RTU) 408. The RTU are implemented by hardware with hardware circuitry for executing the tasks disclosed herein. A RTU 408 can traverse an acceleration structure using its own hardware-implemented traversal logic. A RTU 408 may include one or more intersection engine circuitry 410 that can calculate the intersection of a ray with a bounding volume or primitive (such as a triangle), traversal logic circuitry 412 to traverse the acceleration structure, and stack management circuitry 414 for maintaining the stack used in traversal of the acceleration structure. A RTU 408 may include other subunits as well.

Figure 4A:
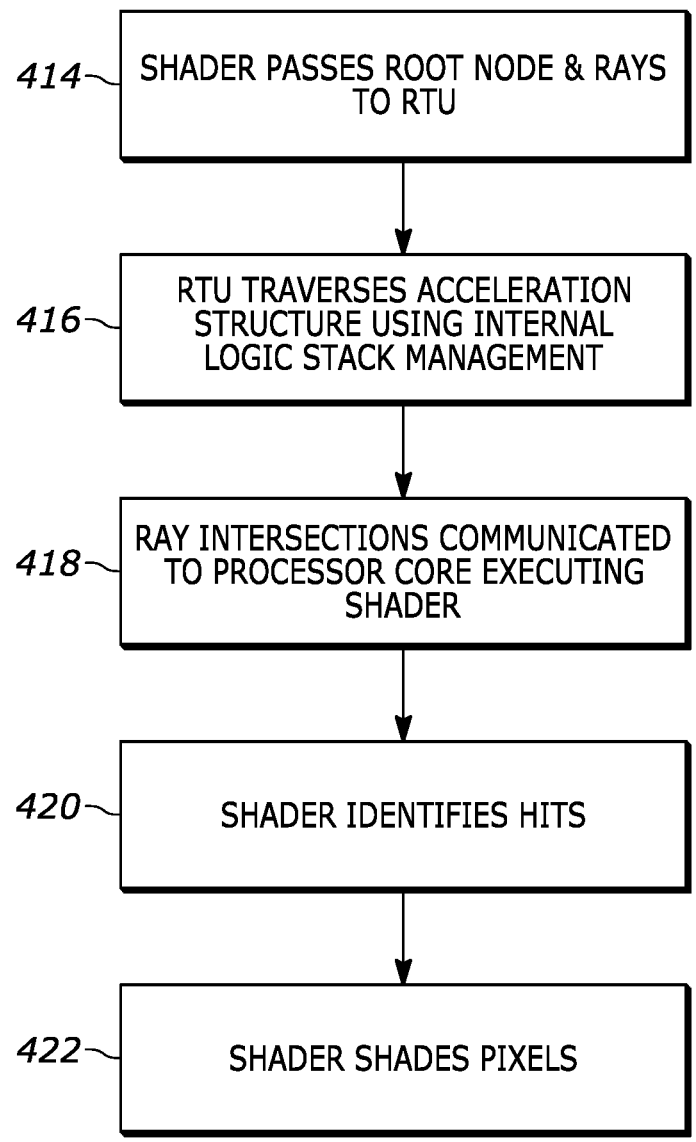
FIGS. 4A, 4B, and 4C illustrate example logic consistent with FIG. 4 in example flow chart format.
Figure 4B:
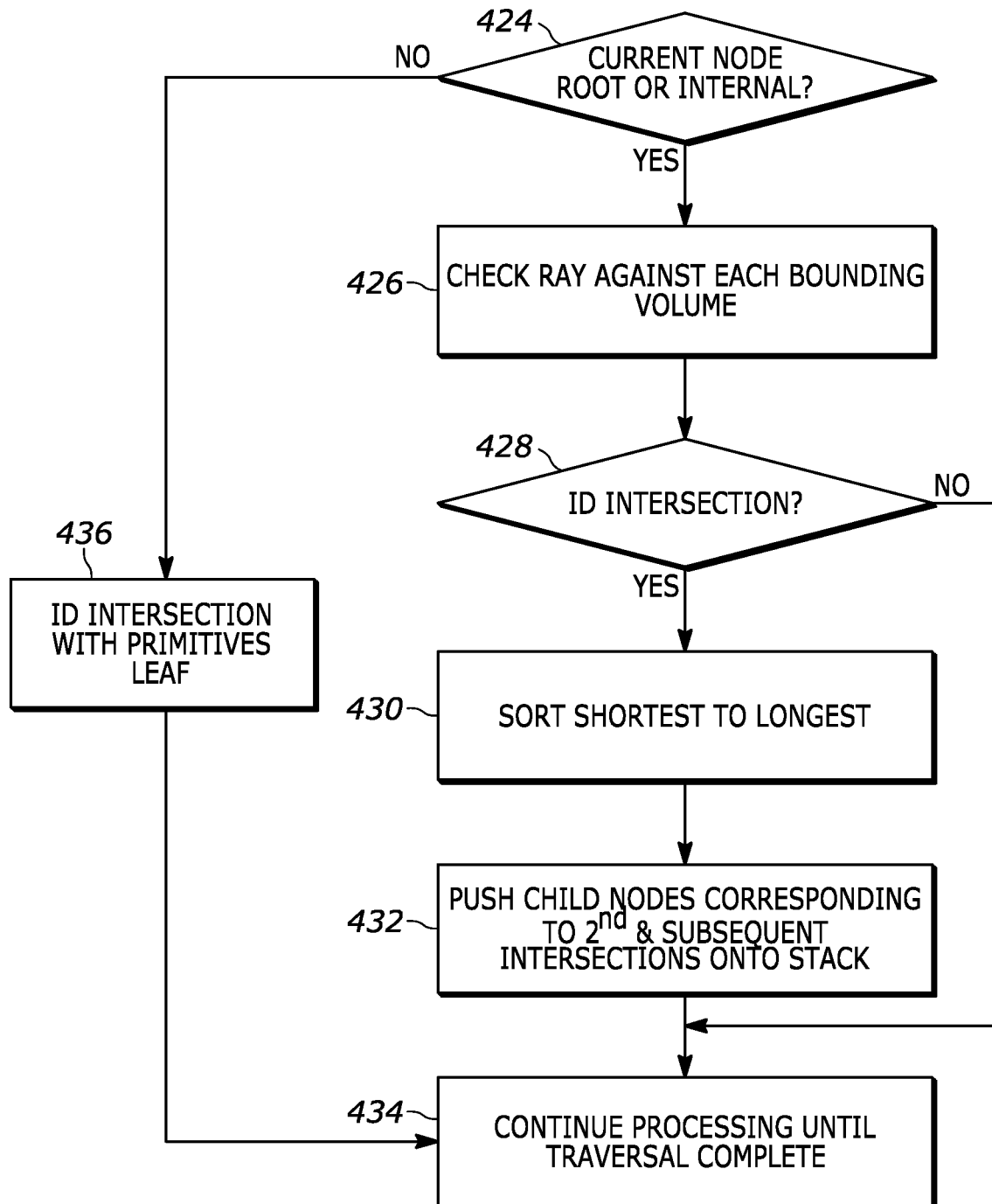

FIG. 4A illustrates high level logic and FIG. 4B illustrates logic in greater granularity that may be implemented by the hardware circuitry in a RTU 410. Commencing at block 414, the shader being executed on a processor core passes the root node of the acceleration structure and ray information to the RTU 410. Using this information, at block 416 the RTU traverses the acceleration structure using its traversal logic circuitry 412 and stack management circuitry 414, identifying intersections of rays with bounding volumes and primitives. One or more of the intersections are communicated to the shader at block 418. The shader identifies hits of any intersections at block 420 and using the overall information gained thereby, shades pixels for rendering at block 422.

In some embodiments, the RTU can include circuitry to execute the stack management and traversal of the acceleration structure illustrated in FIG. 4B. If it is determined at state 424 that the current node is a root node or internal node, the RTU moves to block 426 to check the intersection of the ray with each bounding volume contained in the current node. If it is determined at state 428 that there are multiple intersections, they are sorted at block 430 so that the earliest (i.e., closest to origin of ray) intersection is first, and the rest are in order of distance from the origin of the ray. Essentially, the intersections are sorted shortest to longest (from the origin of the ray). If there is more than one intersection, the child nodes corresponding to the second and subsequent intersections are pushed on the stack at block 432. From block 432 or from state 428 if the test there was negative, the circuitry moves to block 434 to continue processing with the child node corresponding to the first intersection, or if there are no intersections, processing continues with the node popped from the top of the stack. If there is no node to pop because the stack is empty, then the acceleration structure traversal is complete. If it is determined at state 424 that the current node is a leaf, the RTU checks the intersection of the ray with the primitive or primitives contained in the leaf at block 436.

In other embodiments, the traversal may be stackless.

Return to the lower half of FIG. 4, which shows an example traversal using the above strategy. Bold arrows show the traversal of the acceleration structure. Bold solid boxes depict the nodes for which the RTU has found an intersection between the ray and the node's bounding volume and bold dashed boxes depict the nodes for which the RTU has found an intersection between the ray and the primitive contained in the leaf. Leaves in the traversal that are not marked with bold dashed outlines are leaves for which the RTU did not find and intersection between the ray and the primitive contained in the leaf. The specific steps of the example traversal are as follows.

As indicated at 438, traversal begins by processing root node A to identify intersections of the ray with the bounding volumes it contains. As indicated at 440 and 442, bounding volumes corresponding to A's children E and J, respectively, are identified as intersections by the processing of the root node A, and E and J are therefore pushed to the stack. Additionally, the bounding volume corresponding to A's child B is also identified as an intersection from the processing of root node A, and at 444 B is then processed to identify intersections of the ray with its bounding volumes. This in turn identifies primitive D, which is pushed to the stack at 446, and primitive C, which is processed at 448. In the example shown it is determined by this processing that there is not an intersection between the ray and primitive C. Primitive D is popped from the stack and processed at 450 to identify an intersection with the ray; in this example case, an intersection between the ray and primitive D is identified, and the primitive is passed to the shader program to identify whether or not there was a "hit" between ray and primitive (as described below and in FIG. 4C).

As indicated at 452, bounding volume E is then popped from the stack and processed to identify intersections. As indicated at 454, primitives H and I, which are identified from processing bounding volume E, are pushed to the stack and bounding volume F is processed to identify intersection at 456. Primitive G is next processed at 458, an intersection is identified, and primitive G is passed to the shader program for hit testing. Next primitive H is popped from the stack and processed at 460, no intersection is found. Next, primitive I is popped from the stack and processed at 462 (an intersection is identified and primitive I is passed to the shader program for hit testing) and then bounding volume J is popped from the stack and processed at 464. This leads to identifying primitive K, which is processed at 466; no intersection is identified.

The shader program running on a processor core and a RTU collaborate to perform ray tracing. The above example shows processing when the primitives are partially transparent, e.g., they are triangles representing the foliage of a tree. The shader program's objective is to identify the earliest (i.e. closest to origin of ray) intersection with a non-transparent portion of the 3D environment represented by the acceleration structure (a "hit").

Figure 4C:
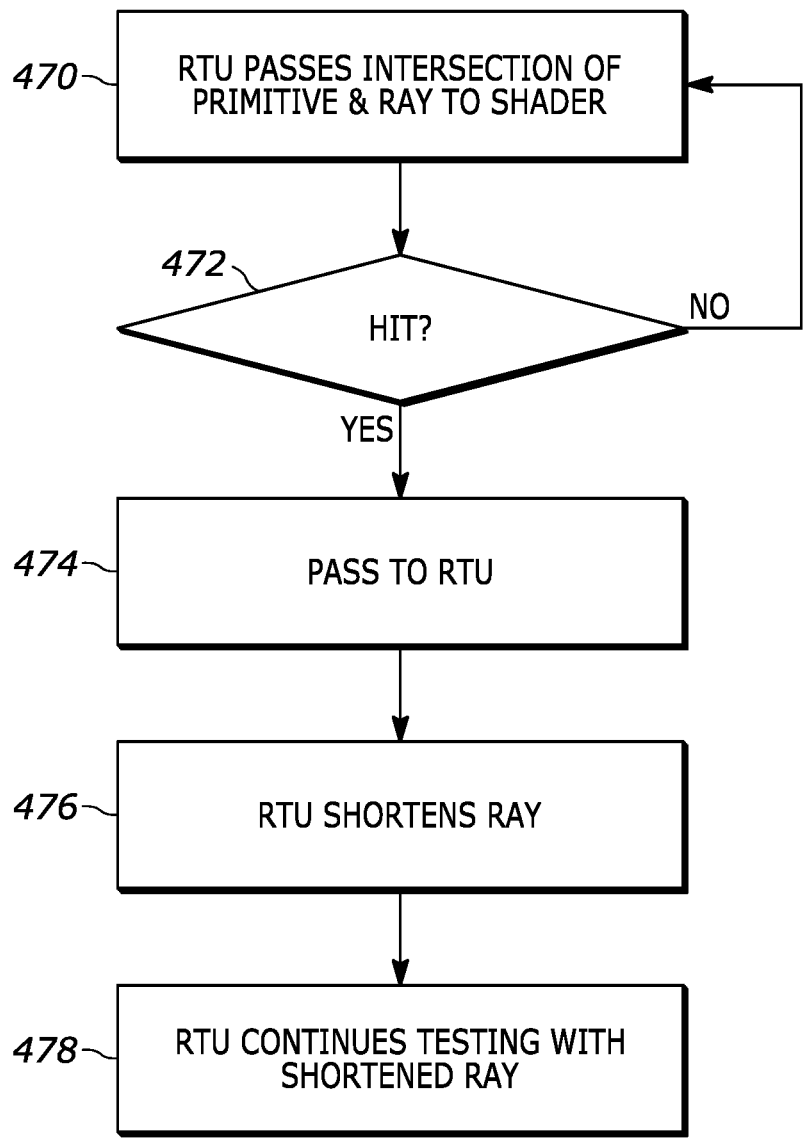

The communication between the shader program and the RTU to accomplish the above is shown in example FIG. 4C. Initially the shader program passes the root node A and the ray information to the RTU, which traverses the acceleration structure until it reaches an intersection between the ray and a primitive, in the example of FIG. 4 primitive D (in this example there was no intersection between the ray and primitive C).

Commencing at block 470 in FIG. 4C, the RTU passes primitive D to the shader program. At state 472 the shader identifies whether the ray hit an opaque portion of primitive D, meaning that it tests primitive D to determine if the ray passed through a transparent portion of the primitive, or hit a solid portion of the primitive. In this example, the ray hit a solid portion of the primitive. The shader program notes primitive D as the earliest intersection encountered so far, and at block 474 passes the result of the intersection (a "hit") to the RTU.

Moving to block 476, the RTU shortens the ray, as there is no point testing past the location of the intersection of the ray with primitive D. Block 478 indicated that the RTU continues traversal of the acceleration structure, reaching primitive G, and determines that the ray intersected it. The RTU passes G to the shader program for hit testing.

The shader program performs hit testing consistent with FIGS. 4 and 4C, determining that the ray passed through a transparent portion of primitive G and consequently there was not a hit. In some embodiments, the shader program passes the information that G was not a hit to the RTU. In other embodiments, as there was no hit, the shader program does not pass the information that primitive G was not a hit to the RTU.

The RTU continues traversal and reaches primitive H, as discussed in relation to FIG. 4. Had the ray not been shortened by the "hit" on primitive D, an intersection would have been detected, but as the ray has been shortened there is no intersection between the ray and primitive H. The RTU continues traversal and reaches primitive I, where it detects an intersection between the ray and the primitive. It passes primitive I to the shader program, which performs hit testing. In this example, the shader program determines that there is a hit, and that the hit of primitive I is earlier (i.e., closer to the origin of the ray) than the hit of primitive D; the shader program therefore updates the earliest intersection encountered to primitive I. The shader program also informs the RTU that there was a hit on primitive I. Once again, the RTU shortens the ray based on the hit on primitive I, and continues its traversal of the acceleration structure, reaching primitive K. There is not an intersection between the ray and primitive K, so the RTU attempts to pop the next node to process from the stack, but the stack is empty. The RTU accordingly terminates processing (it has reached the end of the acceleration structure traversal) and notifies the shader program that it is done. The shader program now knows that the earliest hit is on primitive I, and it continues its processing accordingly.

Each step of this communication between processor core and RTU can be seen in the upper half of FIG. 4. The processor core passes root node A to the RTU; the RTU passes primitive D to the shader program for hit testing, and the shader program reports a hit; the RTU passes primitive G to the shader program for hit testing, and the shader program reports a miss; the RTU passes primitive I to the shader program for hit testing, and the shader program reports a hit; the RTU informs the shader program that acceleration structure traversal is complete.

The above processing strategy may result in a significant improvement of ray tracing speed, as the shader program is only performing hit testing. It is not performing acceleration structure traversal or managing the corresponding stack.

In the above, phrases such as "passes node A," "passes primitive G," and the like describe any strategy for communication, including without limitation passing a pointer to the node or primitive, or passing an ID for the node or primitive. In the above, phrases such as "the RTU informs the shader program" or "the shader program informs the RTU" likewise refer to any strategy for communication, including without limitation "push" strategies such as setting a register and ringing a doorbell, or interrupt driven communication, and "pull" strategies such as reading or polling the status of the other unit.

Figure 5:
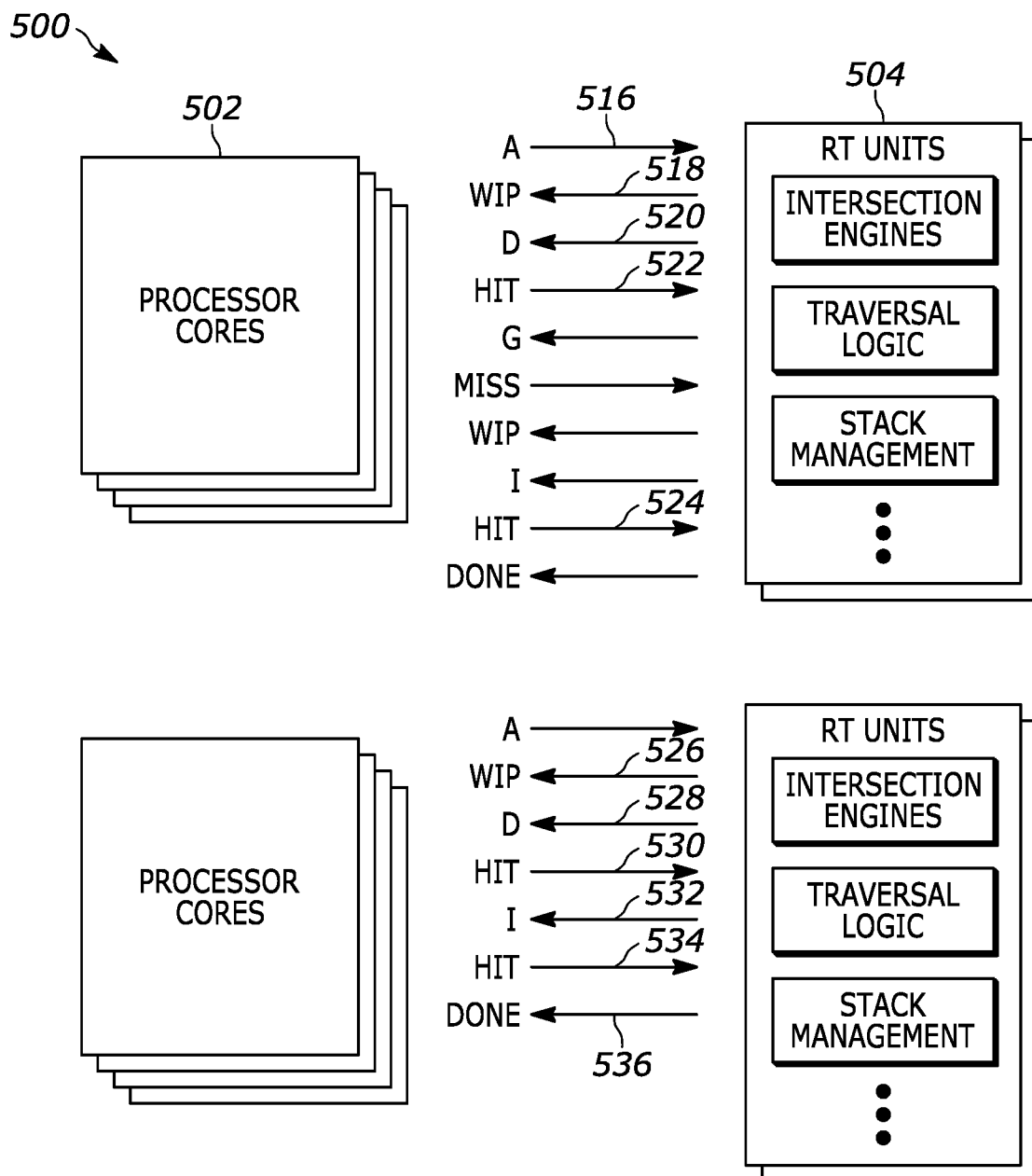
FIG. 5 illustrates two example GPUs executing asynchronous processing between the shaders and the RTUs.
Figure 5A:
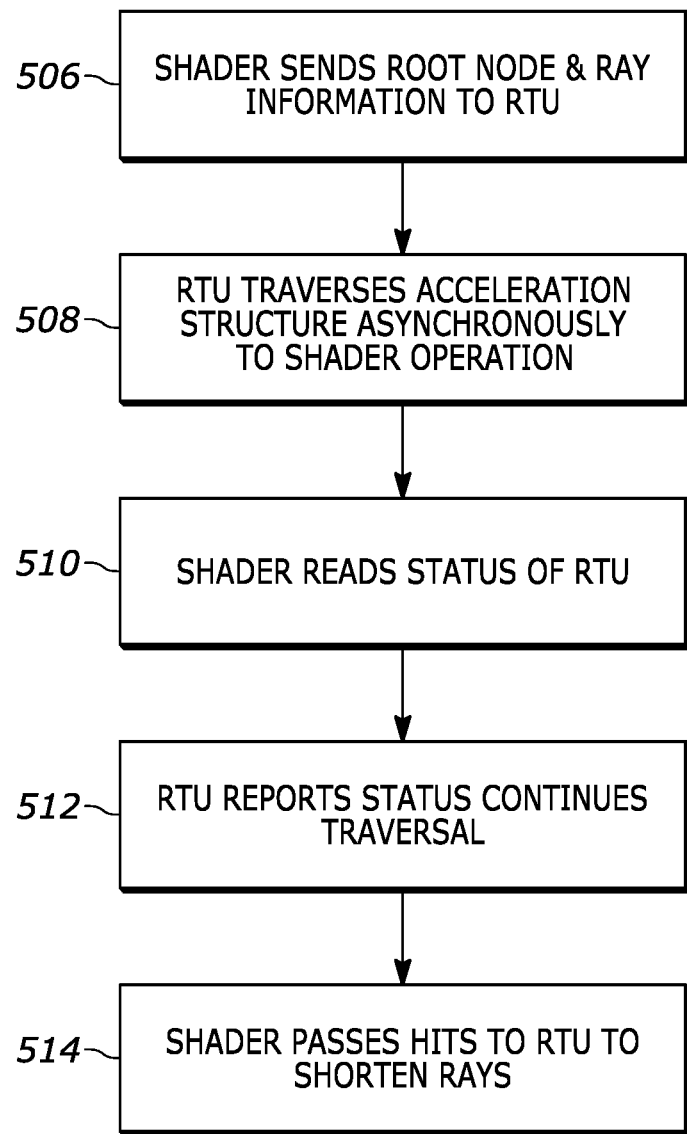
FIG. 5A illustrates example logic consistent with FIG. 5 in example flow chart format.

Turn now to FIGS. 5 and 5A, which illustrates asynchronous operation of the RTU with respect to the shader, and a strategy in which the shader program running on the processor core initiates all aspects of the communication between the shader program and the RTU. Referring to the top half of FIG. 5, a GPU 500 includes one or more processor cores 502 and one or more RTUs 504 operating asynchronously from the shader program. The GPU 500 can be substantially identical in configuration and operation to the GPU 400 shown in FIG. 4 with the exceptions noted below.

FIG. 5A illustrates at block 506 that the shader program sends the root node A and ray information to the RTU to initiate processing. At block 508 the RTU begins traversing the acceleration structure asynchronously to shader operation, with the shader reading status of the RTU periodically at block 510 and the RTU reporting status at block 512 as it continues its traversal. The shader passes hit identifications to the RTU at block 514 to enable the RTU to shorten its rays.

The operation above is reflected in FIG. 5, in which left pointing arrows are requests for information by the shader program, and the right pointing arrows are transfers of information from the shader program to the RTU. More specifically, as indicated at 516, the shader program sends the root node A to the RTU and reads status from the RTU and receives the status "WIP" at 518, meaning that the RTU has not found any intersections yet. The shader program reads status again, and receives the status "D" at 520, meaning that the RTU has found an intersection with primitive D.

The shader program performs hit testing, finds that primitive D was hit by the ray, and informs the RTU of this hit at 522 so that the RTU can shorten the ray. The read/report process continues as the RTU traverses the acceleration structure asynchronously with the shader issuing reads.

In the bottom half of FIG. 5 is an example of another embodiment, where the RTU sorts intersections by distance. This can result in improvement of ray tracing speed. In this example, as before, there are three intersections between ray and primitives. The closest intersection to the ray origin is "I". It is a hit as indicated at 524. The next closest intersection to the ray origin is "G". It is a miss. The farthest intersection from the ray origin is "D". It is a hit as indicated previously.

But now referring to the bottom half of FIG. 5, the first steps are identical to the diagram in the top of FIG. 5. The shader program sends root node A and ray information to the RTU to initiate processing, and then the shader program reads status from the RTU and receives the status "WIP" at 526 meaning that the RTU has not found any intersections yet. The shader program reads status again, and receives the status "D" at 528, meaning that the RTU has found an intersection with primitive D. The shader program performs hit testing, finds that primitive D was hit by the ray, and informs the RTU of this hit at 530 so that the RTU can shorten the ray.

While the shader program was performing hit testing, the RTU traversal determined that there were intersections with primitives G and I, and that primitive I is closer to the ray origin that primitive G (i.e., the RTU sorted the intersections by distance from ray origin). When the shader program next reads status, it is informed that it should perform hit testing on primitive I (not G) at 532, as primitive I is the closest known intersection to the ray origin. As indicated at 534, the shader program performs hit testing, finds that primitive I was hit by the ray, and informs the RTU of this hit. While the shader program was performing hit testing, the RTU finished traversal of the acceleration structure without finding any more intersections. As primitive G's intersection is farther from the ray origin than primitive I, primitive G is discarded. When the shader program next reads status, it is informed at 536 that traversal of the acceleration structure is complete, and no more primitives require hit testing. Such sorting of intersections may also be of value when performing ray tracing of environments with translucency; in that case, it is beneficial for the intersections to be sorted so that the shader program is informed first about the intersection farthest from the ray origin.

Figure 6:
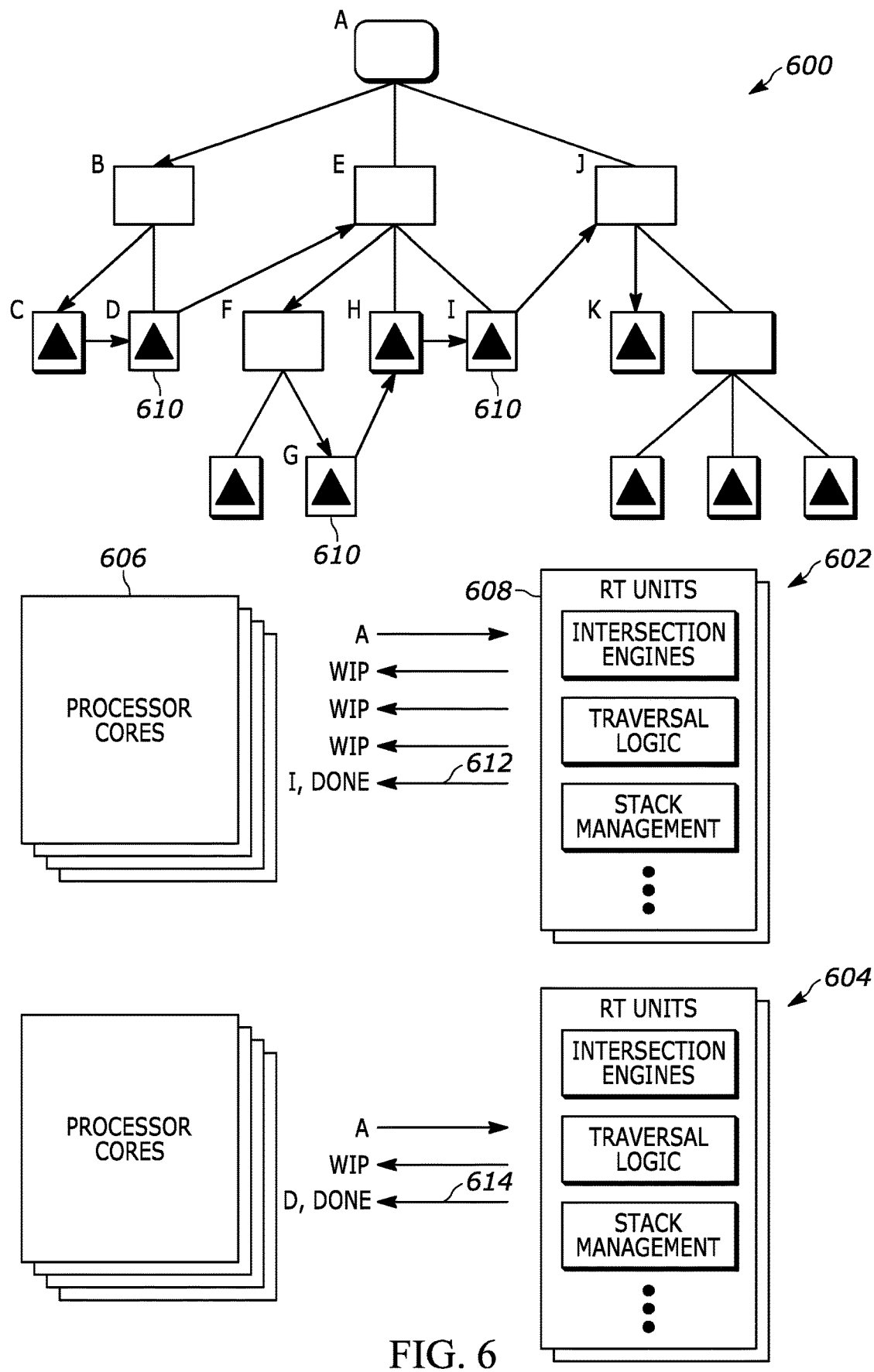
FIG. 6 illustrates a GPU with a traversal diagram showing collaborative processing when hit testing is not required.

FIG. 6 illustrates examples of collaborative processing when hit testing is not required by showing an acceleration traversal diagram 600 executed by the RTU and communication diagrams 602, 604 between one or more processor cores 606 and one or more RTU 608 of a GPU such as any of the GPUs described in FIG. 4 or FIG. 5 or elsewhere herein. As understood herein, if hit testing is not required such as when primitives in the acceleration structure are opaque, then the processing performed by the shader program is further reduced, resulting in increased performance. A primitive may be indicated as being opaque to the RTU by a flag or other means.

In FIG. 6 in which the primitives are opaque, the RTU can track the earliest intersection between the ray and primitives, without the need for the shader program to perform hit testing. The acceleration traversal diagram 600 is essentially the same example shown in FIG. 4 but in FIG. 6 the leaves that the ray intersects are shown in bold solid borders as opposed to bold dashed borders. Thus, as in FIG. 4, there are three intersections with primitives, in the order I-G-D from earliest (closest to ray origin) to farthest.

The communication diagram 602 in the middle of FIG. 6 shows collaborative ray tracing between the shader program and the RTU when locating the earliest hit. Since the RTU can track the earliest intersection, it reports a status of work-in-progress ("WIP") until traversal of the acceleration structure is complete, at which point it reports a status of "done" as indicated at 612 and provides I as the earliest primitive that the ray intersects.

The communication diagram 604 at the bottom of FIG. 6 shows collaborative ray tracing between the shader program and the RTU when the shader program wants to know if there was an intersection but does not need to know the details of the intersection; this is typical of ray tracing for shadows and ambient occlusions. The shader processing ends as soon as it locates a primitive that the ray intersects, in this case it is D as indicated at 614.

Figure 7:
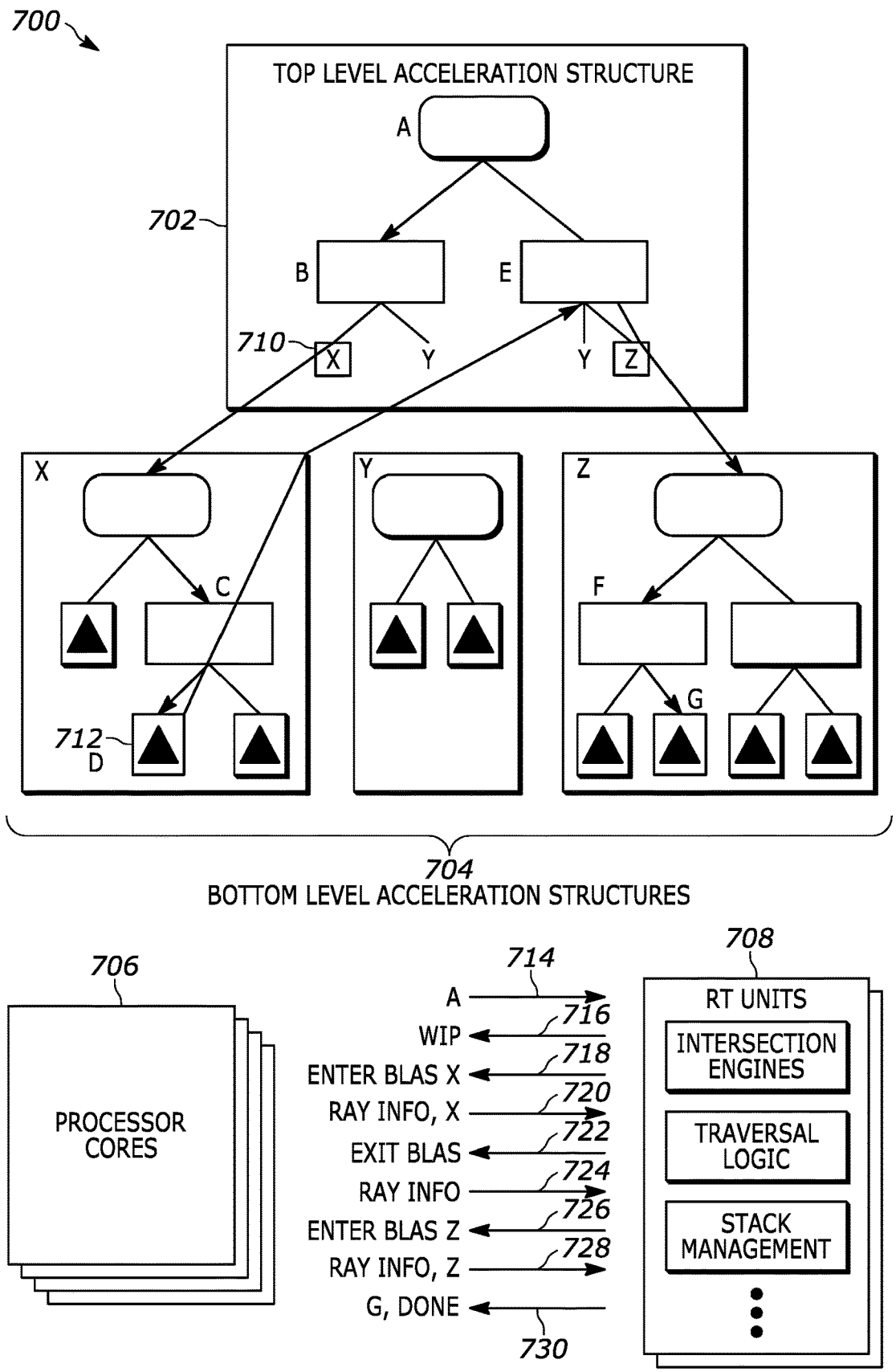
FIG. 7 illustrates further examples involving multi-level acceleration structures.

FIG. 7 illustrates an acceleration structure 700 with a top-level acceleration structure (TLAS) 702 and a set of bottom level acceleration structures (BLAS) 704 similar to those shown in FIG. 2, except as noted below. FIG. 7 also shows a communication diagram between one or more processor cores 706 and one or more RTU 708 of a GPU to illustrate an example of collaborative processing between shader program and RTU when the acceleration structure is a multi-level hierarchy.

The TLAS 702 has leaves (such as X 710) that each give a link to a respective BLAS (such as BLAS X, one of the set of BLAS 704). As discussed previously, the TLAS 702 uses world space coordinates. Each BLAS in the set of BLAS 704 has leaves such as D 712 that contain primitives, and as also discussed previously, each BLAS in the set of BLAS 704 has its own coordinate space. In this example, the shader program's goal is to determine the earliest intersection, and all primitives in the acceleration structure are opaque.

The desired traversal of the acceleration structure 700 that is implemented by the RTU 708 is as follows. Processing of the root node A of the TLAS 720 identifies ray intersections with the bounding volumes representing children B and E; E in the TLAS 702 is pushed to the stack maintained in this case by the RTU, and the bounding volumes contained within B of the TLAS 702 are processed to identify ray intersections. An intersection with the ray is found for the bounding volume within B that corresponds to leaf X; this in turn leads to processing leaf X, which represents the BLAS X of the set of BLAS 704. The coordinate space for X is different from world space coordinates (its primitives have their own coordinate space), so the ray attributes such as ray origin must be transformed.

The root node of BLAS X is processed to identify ray intersections, leading to processing of C; when processing C, an intersection is identified with the bounding volume for leaf node D 712. In the example shown, the processing of leaf node D 712 identifies an intersection with primitive D and recall that since it is assumed primitives in FIG. 7 are opaque, an intersection is automatically counted as a hit. Because D is counted as a hit, the RTU shortens the ray to be the length from the ray origin to D.

Next, E in the TLAS 702 is popped from the stack. The coordinate space for the BLAS portion X will no longer be used, so the ray attributes for world space must be restored. Ray length must be preserved in this process. E is processed to identify ray intersections, and an intersection is identified for the bounding volume corresponding to leaf Z; this in turn leads to processing leaf Z, which represents the BLAS Z of the set of BLAS 704. Once again, because the coordinate space for Z is different from world space coordinates, the ray attributes such as ray origin must be transformed to the coordinate space of Z.

The root node of BLAS Z is processed to identify ray intersections, leading to processing of F and then to the processing of leaf G, which is in the example shown is identified as an intersection (and, thus, a hit in the "opaque" example shown). The ray is shortened to the length between the origin and the primitive of G.

In one embodiment, the RTU detects transitions from the TLAS 702 to BLAS within the set of BLAS 704 and from BLAS within the set of BLAS 704 to the TLAS 702, and the shader program performs the ray transformation updates and passes the result to the RTU. In this example, the communication steps are as shown in FIG. 7, beginning at 714 in which the shader program sends the root node A and ray information to the RTU to initiate processing.

As indicated at 716, the shader program reads status from the RTU and receives the status work in progress ("WIP"), meaning that the RTU has not found any intersections yet. The shader program reads status again, and at 718 receives the status "enter BLAS X," indicating that the RTU has detected a transition to BLAS X in its traversal of the acceleration structure 700. The shader program transforms the ray attributes such as origin to the BLAS X coordinate space and sends (720) the ray attributes and BLAS root node X to the RTU.

The RTU traverses BLAS X and discovers an intersection between the ray and primitive D and shortens the ray accordingly. Recall that this example assumes the primitive is opaque, so there is no need for the shader unit to perform hit testing. The shader program reads status, and receives at 722 the status "exit BLAS," indicating the RTU processing of the BLAS is complete. As indicated at 724, the shader program sends the world space ray attributes to the RTU.

The shader program reads status again, and as indicated at 726 receives the status "enter BLAS Z." The shader program transforms the ray attributes such as origin to the BLAS Z coordinate space and sends at 728 the ray attributes and BLAS root node Z to the RTU. The RTU traverses BLAS Z and discovers an intersection between the ray and primitive G and shortens the ray accordingly. When the shader program next reads status, it is informed at 730 that traversal of the acceleration structure is complete, and that the earliest intersection was with primitive G.

In another embodiment, the RTU can handle the detected transitions from TLAS to BLAS and BLAS to TLAS, updating ray attributes as needed. In this case, in the example in FIG. 7, all processing is performed by the RTU, so after the shader program sends root node A to the RTU, the shader program will read status "WIP" until the RTU traversal of the acceleration structure is complete, at which point the shader program will read status "done" and that the earliest intersection was with primitive "G."

Figure 7A:
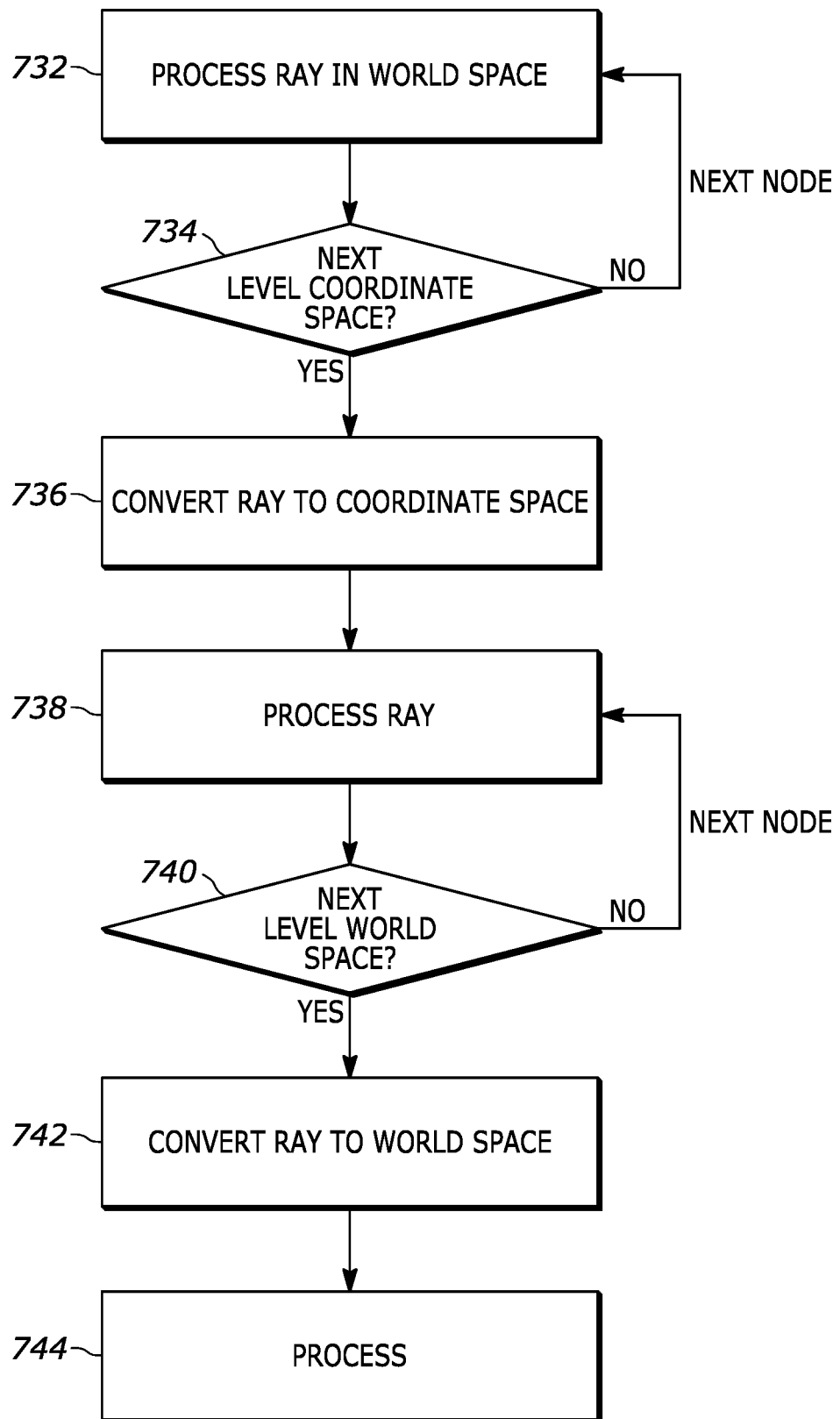
FIG. 7A illustrates example logic consistent with FIG. 7 in example flow chart format.

FIG. 7A illustrates the coordinate transition logic discussed above in terms of logic that may be executed entirely by the RTU or by collaboration between the shader and the RTU. This example illustrates an acceleration structure with two levels. Commencing at block 732, ray-bounding volume intersection determinations are initially executed in world space. As the RTU traverses the acceleration structure, if it is determined at state 734 that the RTU has traversed to a BLAS that is in another coordinate space, the logic moves to block 736 to convert the ray to the coordinate space specific to the BLAS and process the ray at block 738 for intersection identification. Likewise, as the RTU continues to traverse the acceleration structure, if it is determined at state 740 that the RTU has traversed to the TLAS (which is described in world space), the logic moves to block 742 to convert the ray to world space (or restore the ray attributes as they were in world space) and process the ray at block 744 for intersection identification. In variations of the above, the TLAS may not be in world coordinate space but in its own specific coordinate space. In other variations, there are a plurality of levels to the acceleration structure; processing proceeds similarly to FIG. 7A, converting the ray to a new coordinate space as the traversal reaches lower levels of the acceleration structure, and restoring it or converting it as the traversal reaches higher levels of the acceleration structure.

Figure 8:
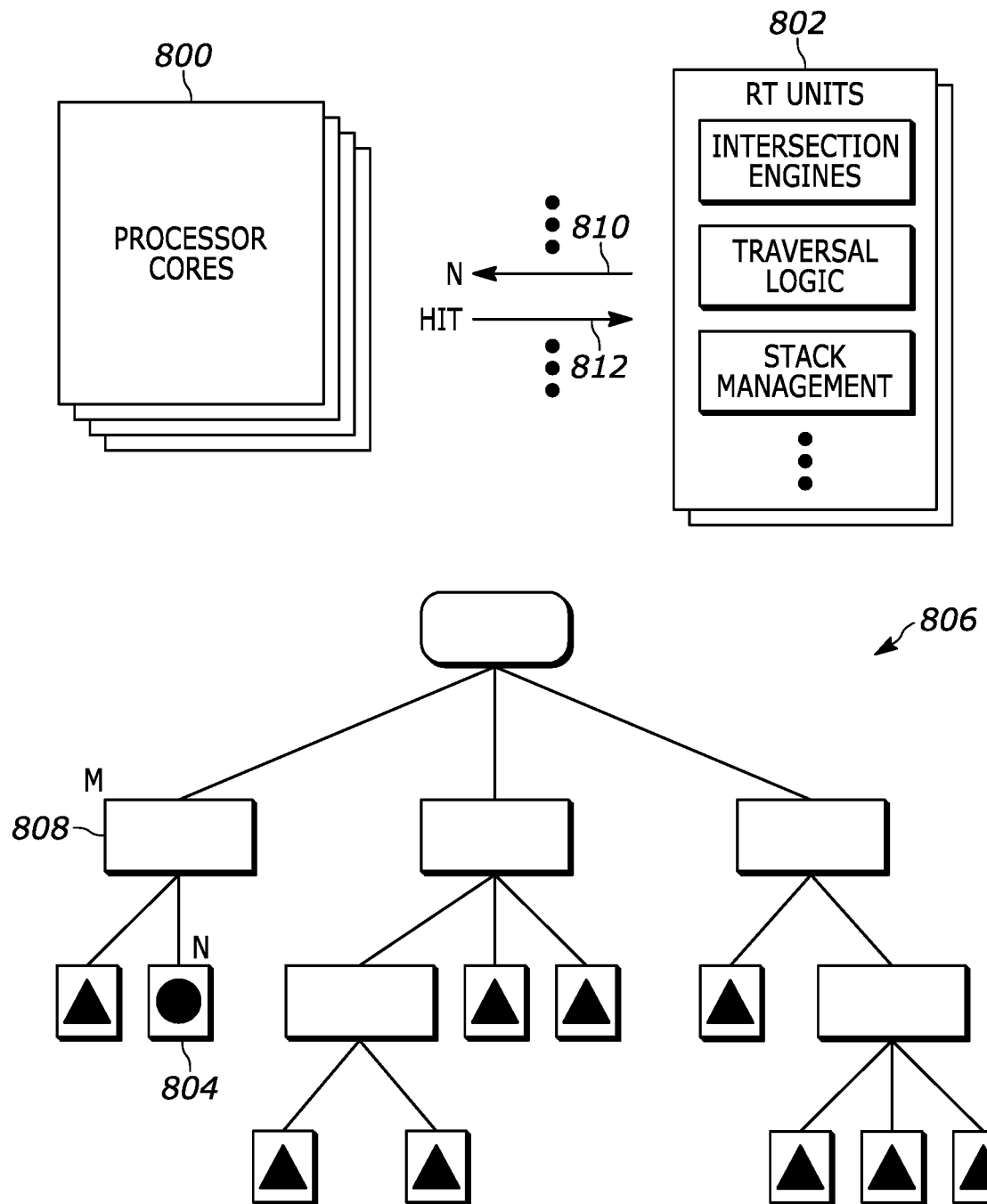
FIG. 8 illustrates a GPU with a traversal diagram showing intersections determined by the shader.

Turn now to FIG. 8, which illustrates an example of intersection determined by the shader executing on one or more processor cores 800 communicating with one or more RTUs 802 of a GPU. In previous examples, the RTU determines whether the ray under test intersects the primitive, e.g., the primitive is a triangle and the RTU's intersection engine can determine intersection between a ray and a triangle. In contrast, in FIG. 8 the geometry associated with a leaf N 804 in an acceleration structure 806 has a geometry is such that the RTU's intersection engine cannot compute the intersection, e.g. it is a sphere.

Accordingly, in some embodiments, the shader program and RTU collaborate to perform ray tracing as follows. The RTU traverses the acceleration structure 806 as discussed elsewhere herein. The RTU tests the ray against the bounding volumes in node M 808 and determines that the ray intersects the bounding volume corresponding to leaf N 804. When the shader program reads status, it receives at 810 the status that the bounding volume for N has been intersected. The shader program performs hit testing between the ray and the sphere contained in leaf N and determines that there has been a hit. It informs the RTU that there has been a hit at 812, and also informs the RTU of the location of the hit so that the ray can be shortened accordingly by the RTU. The fact that the primitive in leaf N is a sphere may be identified by the RTU and/or shader on the basis of a flag or other indicator associated with the primitive that it is a sphere (or other geometry beyond the ability of the RTU to process).

It will be appreciated that whilst present principals have been described with reference to some example embodiments, these are not intended to be limiting, and that various alternative arrangements may be used to implement the subject matter claimed herein.

What is claimed is:

1. A method for graphics processing, comprising:
executing, on a graphics processing unit (GPU), a shader program that performs ray tracing of a 3D environment represented by an acceleration structure;
asynchronous to the shader program, using a hardware-implemented ray tracing unit (RTU) within the GPU that traverses the acceleration structure at the request of the shader program; and
using, at the shader program, results of the acceleration structure traversal;
wherein the shader program is configured to send root node and information related to rays to the RTU to initiate processing in which the RTU is configured to begin traversing the acceleration structure asynchronously to shader program operation, with the shader program reading at least one status of the RTU periodically and the RTU reporting the at least one status as it continues its traversal, the shader program passing hit identifications to the RTU to enable the RTU to shorten rays, the at least one status from the RTU to the shader program indicating the RTU has not found any intersections yet, at least a second status from the RTU indicating that the RTU has found an intersection with a first primitive, the shader program performing hit testing and responsive to finding that the first primitive was hit by a ray, informs the RTU of the hit so that the RTU can shorten the ray.

2. The method of claim 1, wherein using the results comprises shading pixels in computer-generated graphics.

3. The method of claim 1, wherein the results of the acceleration structure traversal by the RTU include the detection of intersection between a first ray and bounding volumes contained within the acceleration structure, and/or intersection between a second ray and primitives contained within the acceleration structure.

4. The method of claim 3, wherein the results of the acceleration structure traversal by the RTU include detection of the earliest intersection between a first ray and primitives contained within the acceleration structure.

5. The method of claim 1, where the RTU processing includes maintenance of a stack used in the acceleration structure traversal.

6. The method of claim 1, wherein the results of the acceleration structure traversal by the RTU include a sorting by the RTU of the intersections detected by the RTU, by distance of the intersections from ray origin, such that:
the RTU detects a first intersection between a first ray and a primitive as it traverses the acceleration structure; and
the RTU detects a second intersection between the first ray and a primitive as it traverses the acceleration structure; and when communicating results from the RTU to the shader program, the second intersection result is communicated before the first intersection result, which also is communicated to the shader program.

7. A method for graphics processing, comprising:
executing, on a graphics processing unit (GPU), a shader program that performs ray tracing of a 3D environment represented by an acceleration structure;
using a hardware-implemented ray tracing unit (RTU) within the GPU that traverses the acceleration structure at the request of the shader program; and
using, at the shader program, results of the acceleration structure traversal, wherein the acceleration structure is a hierarchy with a plurality of levels, wherein the RTU identifies intersections of rays with elements in the acceleration structure, indicates intersections to the shader program, and the shader program performs hit testing, determining whether a ray passed through a transparent portion of an element or hit a non-transparent portion of the element, the RTU sorting intersections by distance, the shader program receiving a status that the RTU has found an intersection with a first primitive, the shader program performing hit testing on the first primitive and responsive to determining the first primitive was hit by the ray, informs the RTU so that the RTU can shorten the ray, the RTU determining intersections with second and third primitives, the third primitive being closer to a ray origin than the second primitive, the shader program accessing RTU information to perform hit testing on the third primitive and not on the second primitive.

8. The method of claim 7, wherein using the results comprises shading pixels in computer-generated graphics.

9. The method of claim 7, wherein the results of the acceleration structure traversal by the RTU include detection of a transition from a higher level to a lower level within the plurality of levels of the acceleration structure.

10. The method of claim 7, wherein the results of the acceleration structure traversal by the RTU include detection of a transition from a lower level to a higher level within the plurality of levels of the acceleration structure.

11. A graphic processing unit (GPU) comprising:
at least one processor core adapted to execute a software-implemented shader; and
at least one hardware-implemented ray tracing unit (RTU) separate from the processor core and adapted to traverse an acceleration structure asynchronously with respect to shader operation to identify intersections of rays with objects represented in the acceleration structure to generate results and return the results to the shader for identification by the shader of hits associated with the intersections wherein the shader is configured to send root node and ray information to the RTU to initiate processing in which the RTU is configured to begin traversing the acceleration structure asynchronously to shader operation, with the shader being configured for reading at least one status of the RTU periodically, the shader being configured for passing hit identifications to the RTU to enable the RTU to shorten rays, at least a first status from the RTU to the shader indicating the RTU has not found any intersections yet, at least a second status from the RTU indicating that the RTU has found an intersection with a first primitive, the shader being configured for performing hit testing and responsive to finding that the first primitive was hit by a ray, the shader being configured for informing the RTU of the hit so that the RTU can shorten the ray.

12. The GPU of claim 11, wherein the RTU comprises hardware circuitry to identify the intersections and the shader is adapted to identify the hits using software.

13. The GPU of claim 11, wherein the shader is configured with instructions executable by the processor core to shade pixels in 3D computer graphics.

14. The GPU of claim 11, wherein the RTU comprises hardware circuitry to implement traversal logic to traverse the acceleration structure.

15. The GPU of claim 11, wherein the RTU comprises hardware circuitry to implement stack management of a stack used in traversal of the acceleration structure.

16. A graphic processing unit (GPU) comprising:
   at least one processor core adapted to execute a software-implemented shader; and
   at least one hardware-implemented ray tracing unit (RTU) separate from the processor core and adapted to traverse an acceleration structure to identify intersections of rays with objects represented in the acceleration structure to generate results and return the results to the shader, the shader being configured for receiving a first status that the RTU has found an intersection with a first primitive, the shader configured for performing hit testing on the first primitive and responsive to determining the first primitive was hit by the ray, the shader being configured for informing the RTU so that the RTU can shorten the ray, the RTU configured for determining intersections with second and third primitives, the third primitive being closer to a ray origin than the second primitive, the shader being configured for accessing RTU information to perform hit testing on the third primitive and not on the second primitive.

17. The GPU of claim 16, wherein the RTU comprises hardware circuitry to identify the intersections and the shader is adapted to identify the hits using software.

18. The GPU of claim 16, wherein the shader is configured with instructions executable by the processor core to shade pixels in 3D computer graphics.

19. The GPU of claim 16, wherein the RTU comprises hardware circuitry to implement stack management of a stack used in traversal of the acceleration structure.

20. The GPU of claim 16, wherein the RTU comprises hardware circuitry to transform at least a first ray from world space to a coordinate space corresponding to a lower level of a multi-level acceleration structure.

21. The GPU of claim 16, wherein the RTU comprises hardware circuitry to transform at least a first ray from a coordinate space corresponding to a lower level of a multi-level acceleration structure to world space.

\* \* \* \* \*